United States Patent
Fan et al.

(10) Patent No.: US 9,982,212 B2
(45) Date of Patent: May 29, 2018

(54) METAL DETERGENT AND PREPARATION METHOD THEREOF AND LUBRICANT OIL CONTAINING METAL DETERGENT

(71) Applicant: XINXIANG RICHFUL LUBE ADDITIVE CO., LTD., Henan (CN)

(72) Inventors: Jinfeng Fan, Henan (CN); Qingwen Qiao, Henan (CN); Xinshui Wan, Henan (CN); Liqiang Zhou, Henan (CN); Shiping Wang, Henan (CN)

(73) Assignee: XINXIANG RICHFUL LUBE ADDITIVE CO., LTD., Henan (CN)

( * ) Notice: Subject to any disclaimer, the term of this patent is extended or adjusted under 35 U.S.C. 154(b) by 0 days. days.

(21) Appl. No.: 15/118,974

(22) PCT Filed: Feb. 13, 2015

(86) PCT No.: PCT/CN2015/072997
§ 371 (c)(1),
(2) Date: Aug. 15, 2016

(87) PCT Pub. No.: WO2016/127388
PCT Pub. Date: Aug. 18, 2016

(65) Prior Publication Data
US 2017/0051227 A1      Feb. 23, 2017

(51) Int. Cl.
| C10M 159/24 | (2006.01) |
| C10M 159/22 | (2006.01) |
| C10M 135/02 | (2006.01) |
| C07G 99/00  | (2009.01) |

(52) U.S. Cl.
CPC ......... *C10M 159/24* (2013.01); *C07G 17/008* (2013.01); *C10M 135/02* (2013.01); *C10M 159/22* (2013.01); C10M 2219/02 (2013.01); C10N 2230/04 (2013.01)

(58) Field of Classification Search
CPC .............. C10M 135/02; C10M 159/22; C10N 2230/04; C07G 17/008
See application file for complete search history.

(56) References Cited

U.S. PATENT DOCUMENTS

| 3,178,368 A * | 4/1965 | Hanneman | ........... C07G 17/008 508/392 |
| 3,810,837 A | 5/1974 | Chafetz et al. | |
| 4,744,921 A * | 5/1988 | Liston | .................. C07G 17/008 508/392 |
| 4,973,411 A | 11/1990 | Jao et al. | |
| 5,370,803 A | 12/1994 | Esche, Jr. et al. | |
| 5,728,657 A * | 3/1998 | Campbell | ............ C10M 159/22 508/460 |
| 2013/0123157 A1 | 5/2013 | Sinquin et al. | |
| 2014/0142015 A1* | 5/2014 | Mahieux | .............. C10M 135/02 508/567 |
| 2014/0287969 A1 | 9/2014 | Jukes | |

FOREIGN PATENT DOCUMENTS

| CN | 1145944 A | 3/1997 |
| CN | 101215248 A | 7/2008 |
| CN | 101372469 A | 2/2009 |
| CN | 101423483 A | 5/2009 |
| CN | 102676276 A * | 9/2012 |
| CN | 102676276 A | 9/2012 |

OTHER PUBLICATIONS

English-language machine translation of Fan reference.*
International Search Report issued in PCT/CN2015/072997 dated Dec. 18, 2015 (6 pages).
Extended European Search Report for European Application No. 15 881 550.6, dated Dec. 12, 2017, 8 pages.

* cited by examiner

*Primary Examiner* — James Goloboy
(74) *Attorney, Agent, or Firm* — RatnerPrestia

(57) ABSTRACT

A metal detergent and a preparation method thereof and a lubricant oil containing the metal detergent. The metal detergent is sulfurized calcium alkyl phenolate, the method for preparing the metal detergent includes the following steps: a) mixing alkyl phenol, a calcium source and base oil to obtain a mixed solution; b) mixing the mixed solution, ethylene glycol and a sulfur source to carry out sulfurization reaction to obtain a sulfurization reaction solution; c) implementing carbonation reaction between the sulfurization reaction solution and $CO_2$ to obtain a carbonation reaction solution; and d) extracting the carbonation reaction solution with a solvent, upon refining, to obtain sulfurized calcium alkyl phenolate; wherein the solvent includes solvent oil, water and oxygenous derivative of hydrocarbon. Experimental results show that the content of free alkyl phenol is below 1.5 wt % in the sulfurized calcium alkyl phenolate prepared using the preparation method provided by the present application.

3 Claims, No Drawings

METAL DETERGENT AND PREPARATION METHOD THEREOF AND LUBRICANT OIL CONTAINING METAL DETERGENT

CROSS REFERENCE TO RELATED APPLICATIONS

This application is the U.S. National Phase Application of PCT/CN2015/072997, filed Feb. 13, 2015, the contents of such application being incorporated by reference herein.

TECHNICAL FIELD

The present invention relates to the field of metal detergent, and particularly to a metal detergent and a preparation method thereof, and lubricant oil containing the metal detergent.

BACKGROUND OF THE INVENTION

Metal detergents belong to an indispensable class of additives in lubricant oil. On the one hand, as surfactants, metal detergents inhibit the severe pollution damage caused by fuels and lubricant oil in internal-combustion engines by means of their solubilization, peptization or detergent dispersing effects; and on the other hand, metal detergents can provide alkaline storage, effectively neutralize harmful inorganic and organic acids inevitably generated from fuels and lubricant oil under operating conditions, and consequently, achieve the goals of slowing down oxidation and deterioration of oil, reducing abrasion and wearing of engines, and prolonging working life of oil and engines.

Sulfurized calcium alkyl phenolate is an important metal detergent, which has excellent detergency under high temperature and acid neutralizing capacity, and meanwhile, has good resistance to oxidation and corrosion. Alkyl phenol is an important raw material for producing sulfurized calcium alkyl phenolate. Currently, the contents of free alkyl phenol in the products from different domestic and foreign manufacturers are 5-10 wt %. Residual free alkyl phenol in products may have side effects on the detergency and resistance to oxidation of the products. Meanwhile, the environmental problems generated therefrom can not be neglected: said substance is not easily degraded under the environments of soil, water area, etc., and can be accumulated in organisms, produce obvious estrogen effect, cause varying degrees of endocrine toxicity, reproductive toxicity, neurotoxicity, immunotoxicity, genetic toxicity or the like on organisms, and cause severe threats to the entire ecosystem.

SUMMARY OF THE INVENTION

To solve the above technical problems, the present invention provides a metal detergent and a preparation method thereof as well as lubricant oil containing the metal detergent. The metal detergent provided by the present invention is sulfurized calcium alkyl phenolate. The metal detergent prepared using the method provided by the present invention has low content of free alkyl phenol.

The present invention provides a method for preparing sulfurized calcium alkyl phenolate, comprising the following steps:

a) mixing alkyl phenol, a calcium source and base oil to obtain a mixed solution;

b) mixing the mixed solution, ethylene glycol and a sulfur source to carry out sulfurization reaction to obtain a sulfurization reaction solution;

c) implementing carbonation reaction between the sulfurization reaction solution and $CO_2$ to obtain a carbonation reaction solution; and d) extracting the carbonation reaction solution with a solvent, upon refining, to obtain the sulfurized calcium alkyl phenolate;

wherein the solvent includes solvent oil, water and oxygenous derivative of hydrocarbon.

Preferably, the oxygenous derivative of hydrocarbon is alcohol and/or ketone.

Preferably, the solvent oil has a boiling point greater than 100° C.

Preferably, the mass ratio of the solvent oil, the oxygenous derivative of hydrocarbon and water is 130-450:100-350:1-20.

Preferably, in step b), the sulfurization reaction is carried out in the presence of a sulfurization accelerator.

Preferably, the step b) is performed by adding ethylene glycol, the sulfur source and the sulfurization accelerator to the mixed solution to implement sulfurization reaction, yielding a sulfurization reaction solution; the ethylene glycol is added to the mixed solution dropwise; the sulfur source and the sulfurization accelerator are added to the mixed solution in batches.

Preferably, in step c), the sulfurization reaction solution is dehydrated before carbonation reaction between the sulfurization reaction solution and $CO_2$ occurs.

Preferably, the step a) is performed by mixing alkyl phenol, calcium source, base oil, alkyl benzenesulfonic acid, fatty acid, fatty alcohol and polyisobutylene succinic anhydride to obtain the mixed solution.

The present invention provides a sulfurized calcium alkyl phenolate prepared by the method according to any one of claims 1-8, wherein the content of free alkyl phenol is below 1.5 wt % in the sulfurized calcium alkyl phenolate.

The present invention provides a lubricant oil containing 0.5-25 weight parts of the sulfurized calcium alkyl phenolate prepared by the above preparation method and 99.5-75 weight parts of base oil.

Compared with the prior art, the present invention provides a metal detergent and a preparation method thereof as well as a lubricant oil containing the metal detergent. The metal detergent provided by the present invention is sulfurized calcium alkyl phenolate. The preparation method of the metal detergent includes the following steps: a) mixing alkyl phenol, a calcium source and base oil to obtain a mixed solution; b) mixing the mixed solution, ethylene glycol and a sulfur source to carry out sulfurization reaction to obtain a sulfurization reaction solution; c) implementing carbonation reaction between the sulfurization reaction solution and $CO_2$ to obtain a carbonation reaction solution; and d) extracting the carbonation reaction solution with a solvent, upon refining, to obtain the sulfurized calcium alkyl phenolate; wherein the solvent includes solvent oil, water and oxygenous derivative of hydrocarbon. In the present invention, a product from carbonation reaction is obtained by mixing the materials, and carrying out the sulfurization reaction and the carbonation reaction; the content of free alkyl phenol in the sulfurized calcium alkyl phenolate product is reduced by extracting the free alkyl phenol in the product from carbonation reaction with a solvent containing solvent oil and oxygenous derivative of hydrocarbon. Experimental results show that the content of free alkyl phenol is below 1.5 wt % in the sulfurized calcium alkyl phenolate prepared using the preparation method provided by the present invention.

DETAILED EMBODIMENTS

To further understand the present invention, preferred embodiments of the present invention are described below in conjunction with Examples. However, it should be understood that these descriptions are only for purpose of further illustrating the characteristics and advantages of the present invention, without constituting any limitation to the claims of the present invention.

The present invention provides a method for preparing sulfurized calcium alkyl phenolate, comprising the following steps:

a) mixing alkyl phenol, a calcium source and base oil to obtain a mixed solution;

b) mixing the mixed solution, ethylene glycol and a sulfur source to carry out sulfurization reaction to obtain a sulfurization reaction solution;

c) implementing carbonation reaction between the sulfurization reaction solution and $CO_2$ to obtain a carbonation reaction solution; and d) extracting the carbonation reaction solution with a solvent, upon refining, to obtain the sulfurized calcium alkyl phenolate;

wherein the solvent includes solvent oil, water and oxygenous derivative of hydrocarbon.

In the present invention, step a) is performed at first. The process is performed by mixing alkyl phenol, the calcium source and the base oil. The alkyl phenol is preferably $C_5$-$C_{15}$ alkyl phenol, and more preferably one or more of hexyl phenol, heptyl phenol, octyl phenol, nonyl phenol, decyl phenol, undecyl phenol, dodecyl phenol, tridecyl phenol, tetradecyl phenol and pentadecyl phenol. In one example provided by the present invention, the alkyl phenol is $C_9$-$C_{15}$ alkyl phenol, i.e. a mixture consisting of nonyl phenol, decyl phenol, undecyl phenol, dodecyl phenol, tridecyl phenol, tetradecyl phenol and pentadecyl phenol. In one example provided by the present invention, the content of dodecyl phenol in the $C_9$-$C_{15}$ alkyl phenol is greater than 50 wt %; in another example provided by the present invention, the content of dodecyl phenol in the $C_9$-$C_{15}$ alkyl phenol is 60-95 wt %; in other examples provided by the present invention, the content of dodecyl phenol in the $C_9$-$C_{15}$ alkyl phenol is 70-75 wt %; in other examples provided by the present invention, the content of dodecyl phenol in the $C_9$-$C_{15}$ alkyl phenol is 75-80 wt %; and in still other examples provided by the present invention, the content of dodecyl phenol in the $C_9$-$C_{15}$ alkyl phenol is 80-90 wt %. The calcium source is preferably calcium oxide and/or calcium hydroxide. The base oil is preferably one or more of 100SN base oil, 150SN base oil, 200SN base oil, 220SN base oil, 250SN base oil, 300SN base oil, 350SN base oil, 400SN base oil, 450SN base oil, and 500SN base oil. The mass ratio of the alkyl phenol, the calcium source and the base oil is preferably 50-200:20-150:50-150, more preferably 95-140:42-80:85-130, and most preferably 110-130:48-70:100-120. After the alkyl phenol, the calcium source and the base oil are homogenously mixed, the mixed solution is obtained.

In an example provided by the present invention, the step a) is performed by mixing alkyl phenol, a calcium source, base oil, alkyl benzenesulfonic acid, fatty acid, fatty alcohol and polyisobutylene succinic anhydride to obtain a mixed solution. Among these, the alkyl phenol is preferably $C_5$-$C_{15}$ alkyl phenol, more preferably one or more of hexyl phenol, heptyl phenol, octyl phenol, nonyl phenol, decyl phenol, undecyl phenol, dodecyl phenol, tridecyl phenol, tetradecyl phenol and pentadecyl phenol. In an example provided by the present invention, the alkyl phenol is $C_9$-$C_{15}$ alkyl phenol, i.e. a mixture consisting of nonyl phenol, decyl phenol, undecyl phenol, dodecyl phenol, tridecyl phenol, tetradecyl phenol and pentadecyl phenol. In one example provided by the present invention, the content of dodecyl phenol in the $C_9$-$C_{15}$ alkyl phenol is greater than 50 wt %; in another example provided by the present invention, the content of dodecyl phenol in the $C_9$-$C_{15}$ alkyl phenol is 60-95 wt %; in other examples provided by the present invention, the content of dodecyl phenol in the $C_9$-$C_{15}$ alkyl phenol is 70-75 wt %; in other examples provided by the present invention, the content of dodecyl phenol in the $C_9$-$C_{15}$ alkyl phenol is 75-80 wt %; and in still other examples provided by the present invention, the content of dodecyl phenol in the $C_9$-$C_{15}$ alkyl phenol is 80-90 wt %. The calcium source is preferably calcium oxide and/or calcium hydroxide. The base oil is preferably one or more of 100SN base oil, 150SN base oil, 200SN base oil, 220SN base oil, 250SN base oil, 300SN base oil, 350SN base oil, 400SN base oil, 450SN base oil and 500SN base oil; the alkyl benzenesulfonic acid is preferably $C_{10}$-$C_{30}$ alkyl benzenesulfonic acid, and more preferably one or more of dodecyl benzenesulfonic acid, tridecyl benzenesulfonic acid, tetradecyl benzenesulfonic acid, pentadecyl benzenesulfonic acid, hexadecyl benzenesulfonic acid, heptadecyl benzenesulfonic acid, octadecyl benzenesulfonic acid, nonadecyl benzenesulfonic acid, eicosyl benzenesulfonic acid, heneicosyl benzenesulfonic acid, docosyl benzenesulfonic acid, tricosyl benzenesulfonic acid and tetracosyl benzenesulfonic acid; the fatty acid is preferably $C_{12}$-$C_{20}$ fatty acid, and more preferably one or more of tetradecanoic acid, pentadecanoic acid, hexadecanoic acid, heptadecanoic acid and octadecanoic acid; the fatty alcohol is preferably $C_{12}$-$C_{22}$ fatty alcohol, and more preferably one or more of tetradecyl alcohol, pentadecyl alcohol, cetyl alcohol, heptadecanol, octadecyl alcohol, nonadecyl alcohol and eicosanol; the polyisobutylene succinic anhydride has a number average molecular weight of preferably 2,000-4,800, and more preferably 2,400-3,380; and the polyisobutylene succinic anhydride has a polymerization degree of preferably 15-30, and more preferably 16-22. The mass ratio of the alkyl phenol, the calcium source, the base oil, the alkyl benzenesulfonic acid, the fatty acid, the fatty alcohol and the polyisobutylene succinic anhydride is preferably 50-200:20-150:50-150:5-20:5-20:3-15:0.1-5, more preferably 95-140:42-80:85-130:8-12:8.5-15:5.5-10.5:0.5-3, and most preferably 110-130:48-70:100-120:9-11:12-14:8-9:1.2-2.7.

After obtaining the mixed solution, step b) is carried out, wherein the process is performed by mixing the mixed solution, ethylene glycol and a sulfur source to carry out sulfurization reaction. Among these, the sulfur source is preferably sulfur. The mass ratio of the ethylene glycol to the alkyl phenol in the mixed solution is preferably 10-90:50-200, more preferably 25-70:90-140, and most preferably 35-50:110-130; the mass ratio of the sulfur source to the alkyl phenol in the mixed solution is preferably 10-40:50-200, more preferably 15-30:90-140, and most preferably 18-24:110-130. In one example provided by the present invention, the sulfurization reaction is carried out in the presence of a sulfurization accelerator. The sulfurization accelerator is preferably sulfurization accelerator NS and/or sulfurization accelerator DM. The mass ratio of the sulfurization accelerator to the alkyl phenol in the mixed solution is preferably 0.01-3:50-200, more preferably 0.3-2:90-140, and most preferably 0.6-1.3:110-130. The sulfurization reaction is carried out at preferably 130-200° C., more preferably 145-185° C. for a time of preferably 3-18 h, more preferably 5-15 h, and most preferably 6-12 h. After the sulfurization reaction is complete, a sulfurization reaction solution is obtained.

In an example provided by the present invention, the step b) is performed by adding ethylene glycol, a sulfur source and a sulfurization accelerator to the mixed solution to carry out sulfurization reaction, thereby yielding a sulfurization reaction solution, wherein the sulfur source is preferably sulfur; the sulfurization accelerator is preferably sulfurization accelerator NS and/or sulfurization accelerator DM. The mass ratio of the ethylene glycol to the alkyl phenol in the mixed solution is preferably 10-90:50-200, more preferably 25-70:90-140, and most preferably 35-50:110-130; the mass ratio of the sulfur source to the alkyl phenol in the mixed solution is preferably 10-40:50-200, more preferably 15-30:90-140, and most preferably 18-24:110-130; the mass ratio of the sulfurization accelerator to the alkyl phenol in the mixed solution is preferably 0.01-3:50-200, more preferably 0.3-2:90-140, and most preferably 0.6-1.3:110-130. In this example, the ethylene glycol is preferably added to the mixed solution dropwise. Calculated on the basis that the content of the alkyl phenol in the mixed solution is 110-130 weight parts, the rate of adding dropwise of ethylene glycol is preferably 0.01-0.5 weight part/min, more preferably 0.03-0.3 weight part/min, and most preferably 0.06-0.15 weight part/min. The sulfur source and the sulfurization accelerator is preferably added to the mixed solution in batches, more preferably in 2-5 batches, and most preferably in 2-3 batches. The time interval between addition of each batch of the sulfur source and the sulfurization accelerator is preferably 1-6 h, and more preferably 2-4 h. The sulfurization reaction occurs during the process of adding ethylene glycol, a sulfur source and a sulfurization accelerator to the mixed solution. The temperature for sulfurization reaction is preferably 130-200° C., more preferably 145-185° C.; and the time for sulfurization reaction is preferably 3-18 h, more preferably 5-15 h, and most preferably 6-12 h. In this example, the time for sulfurization reaction is the total elapsed time which begins from the time of adding ethylene glycol, a sulfur source and a sulfurization accelerator to the mixed solution and ends when the sulfurization reaction is over. After the sulfurization reaction is complete, a sulfurization reaction solution is obtained. In the present invention, the sulfur source and the sulfurization accelerator is added to the mixed solution in batches, which can render the sulfurization reaction is carried out more completely.

After obtaining the sulfurization reaction solution, step c) is carried out. The process is specifically performed by implementing carbonation reaction between the sulfurization reaction solution and $CO_2$. In the present invention, implementing carbonation reaction between the sulfurization reaction solution and $CO_2$ is preferably realized by introducing $CO_2$ gas into the sulfurization reaction solution. The mass ratio of $CO_2$ to the alkyl phenol in step a) is preferably 9-100:50-200, more preferably 20-75:90-140, and most preferably 37-54:110-130. The temperature for the carbonation reaction is preferably 110-220° C., more preferably 130-190° C., and most preferably 145-180° C. The time for the carbonation reaction is preferably 1-12 h, more preferably 2-9 h, and most preferably 3-7.5 h.

In an example provided by the present invention, before implementing carbonation reaction between the sulfurization reaction solution and $CO_2$, the sulfurization reaction solution is dehydrated at first. The dehydration is preferably conducted in a water segregator; the operating temperature of the water segregator is preferably controlled at 120-200° C., and more preferably controlled at 150-170° C. During the dehydration process, the water content in the sulfurization reaction solution is continuously reduced, when the water content in the sulfurization reaction solution has been reduced to 1-4 wt %, preferably 2.5-3.1 wt %, the dehydration is stopped, and carbonation reaction is carried out. In the present invention, after the sulfurization reaction solution is dehydrated, carbonation reaction is then carried out, such that colloidal calcium carbon particles generated from carbonation reaction is more uniform and the stability of colloidal calcium carbon is enhanced.

After the completion of carbonation reaction, a carbonation reaction solution is obtained. The carbonation reaction solution is moved to step d), which is specifically performed by extracting the carbonation reaction solution with a solvent. The solvent includes solvent oil, oxygenous derivative of hydrocarbon and water. The boiling point of the solvent oil is preferably greater than 100° C. The solvent oil is preferably one or more of 100# solvent oil, 120# solvent oil, 140# solvent oil, 150# solvent oil, 180# solvent oil, 190# solvent oil, 200# solvent oil, 260# solvent oil, 270# solvent oil, 280# solvent oil, 300# solvent oil and 330# solvent oil. The oxygenous derivative of hydrocarbon is preferably alcohol and/or ketone. The alcohol is preferably one or more of methanol, ethanol and propanol. The ketone is preferably one or more of acetone, butanone and butanedione. In an example provided by the present invention, the oxygenous derivatives of hydrocarbon are alcohol and ketone, the mass ratio of alcohol to ketone is preferably 50-300:1-30, more preferably 100-250:2-20, and most preferably 136-250:2-8; in another example provided by the present invention, the oxygenous derivatives of hydrocarbon are methanol and butanone, the mass ratio of methanol to butanone is preferably 50-250:1-30, more preferably 150-200:3-10, and most preferably 170-180:5-10; in other examples provided by the present invention, the oxygenous derivatives of hydrocarbon are methanol, ethanol and butanone, the mass ratio of methanol, ethanol and butanone is preferably 65-185:15-85:1-30, more preferably 130-160:50-65:8-12; in other examples provided by the present invention, the oxygenous derivatives of hydrocarbon are methanol and acetone, the mass ratio of methanol to acetone is preferably 80-165:2-20, more preferably 100-136:4-10; in other examples provided by the present invention, the oxygenous derivatives of hydrocarbon are methanol, propanol and butanedione, the mass ratio of methanol, propanol and butanedione is preferably 150-200:45-100:1-10, more preferably 160-180:55-70:2-5. The mass ratio of the solvent oil, the oxygenous derivatives of hydrocarbon and water is preferably 130-450:100-350:1-20, more preferably 150-400:120-300:2-15; and most preferably 180-350:140-252:4-10. The mass ratio of the solvent to the alkyl phenol in step a) is preferably 300-700:50-200, more preferably 400-700:90-150, and most preferably 408-650:110-130. After the carbonation reaction solution has been fully extracted, refinement is implemented so as to obtain the sulfurized calcium alkyl phenolate. In an example provided by the present invention, the refinement includes: implementing distillation, centrifugation and filtration sequentially. The mode of distillation is preferably distillation under vacuum; and the distillation is conducted at a temperature of preferably 180-220° C., and more preferably 210-220° C. The centrifugation is conducted at a temperature of preferably 100-120° C., and more preferably 105-110° C. In an example provided by the present invention, the carbonation reaction solution after completion of extraction is subjected to distillation and centrifugation, mixed with a filter aid first, and then subjected to filtration. The filter aid is preferably diatomaceous earth. The mass ratio of the filter aid to the alkyl phenol in step a) is preferably 5-30:50-200, more preferably 5-20:90-150, and most preferably 8-16:110-130.

In the present invention, the content of free alkyl phenol in the sulfurized calcium alkyl phenolate product is reduced by extracting the free alkyl phenol in the product from carbonation reaction with a solvent containing solvent oil and oxygenous derivative of hydrocarbon. The sulfurized calcium alkyl phenolate provided by the present invention can be added to lubricating oil as a metal detergent, reduce the amounts of sludge and paint film generated during the use of lubricating oil, prolong the utility time of the lubricating oil. Experimental results show that the content of free alkyl phenol is below 1.5 wt % in the sulfurized calcium alkyl phenolate prepared using the preparation method provided by the present invention, the total base number is 250-300 mg KOH/g, the kinematic viscosity is 210-280 mm$^2$/s, the calcium content is 8-12 wt %, and the sulfur content is 3-4 wt %.

The present invention provides a sulfurized calcium alkyl phenolate which is prepared according to the above preparation method, wherein the content of free alkyl phenol is below 1.5 wt % in the sulfurized calcium alkyl phenolate.

The sulfurized calcium alkyl phenolate provided by the present invention is prepared according to the above preparation method, wherein the content of free alkyl phenol thereof is below 1.5 wt %, the total base number is 250-300 mg KOH/g, the kinematic viscosity is 210-280 mm$^2$/s, the calcium content is 8-12 wt %, and the sulfur content is 3-4 wt %.

The present invention provides a lubricating oil containing: 0.5-25 weight parts of the sulfurized calcium alkyl phenolate prepared by the above preparation method and 99.5-75 weight parts of base oil.

The lubricating oil provided by the present invention includes the sulfurized calcium alkyl phenolate and base oil, wherein the content of the sulfurized calcium alkyl phenolate is 0.5-25 weight parts, and the content of the base oil is 99.5-75 weight parts.

In the lubricating oil provided by the present invention, sulfurized calcium alkyl phenolate is added to the base oil, which reduces the amounts of sludge and paint film generated during the use of the lubricating oil, and prolongs the utility time of lubricating oil.

For the sake of more clarity, the present invention is illustrated below in details by way of the following Examples.

EXAMPLE 1

110 weight parts of $C_9$-$C_{15}$ alkyl phenol (dodecyl phenol content was 70-75 wt %), 100 weight parts of 150SN base oil, 50 weight parts of calcium oxide, 9 weight parts of dodecyl benzenesulfonic acid, 12 weight parts of octadecanoic acid, 8 weight parts of cetyl alcohol and 1.2 weight parts of polyisobutylene succinic anhydride (number average molecular weight: 3080, and degree of polymerization: 20) were placed into a reaction kettle and homogenously mixed under heat and stirring to obtain a mixed solution. To the mixed solution were added 12 weight parts of sulfur and 0.5 weight parts of accelerator DM to obtain a mixed system consisting of the mixed solution, sulfur and accelerator DM, then 44 weight parts of ethylene glycol was added to the mixed system dropwise at a rate of 0.15 weight parts/min. During the dropwise addition of ethylene glycol, the mixed system began to be subjected to sulfurization reaction; after the sulfurization reaction was carried out for 3 h, 9 weight parts of sulfur and 0.4 weight parts of accelerator DM were added, and the sulfurization reaction was continued for 3 h. The sulfurization reaction temperature was 160-180° C., totally lasted for 6 h, and a sulfurization reaction solution was obtained. The sulfurization reaction solution was maintained was at a temperature of 160-170° C. and dehydrated. When the water content of the system was 2.5 wt %, dehydration was stopped, and 37 weight parts of $CO_2$ was introduced to carry out carbonation reaction. The carbonization reaction temperature was 145-155° C., the carbonization reaction time was 5 h, and a carbonation reaction solution was obtained after carbonation reaction was complete. The unreacted alkyl phenol in the carbonation reaction solution was extracted using a solvent consisting of 250 weight parts of 180# solvent oil, 170 weight parts of methanol, 5 weight parts of water and 5 weight parts of butanone, the carbonation reaction solution after extraction was subjected to distillation under vacuum under conditions of −0.098 MPa and 210° C., then cooled down to 105° C. and centrifuged. The solution after centrifugation was mixed with 11 weight parts of diatomaceous earth homogenously and then filtrated to obtain 295 weight parts of sulfurized calcium alkyl phenolate product.

The resulting sulfurized calcium alkyl phenolate product was subjected to test and the results were as follows: the content of free alkyl phenol was 0.7 wt %, the total base number was 275 mg KOH/g, the kinematic viscosity was 221 mm$^2$/s, the calcium content was 9.9 wt %, and the sulfur content was 3.2 wt %.

In this Example, the content of free alkyl phenol was tested using the high-performance solution chromatography; the total base number was tested according to the standard method ASTM D2896; the kinematic viscosity was tested according to the standard method ASTM D445; the calcium content was tested according to the standard method ASTM D4951; and the sulfur content was tested according to the standard method ASTM D1552.

EXAMPLE 2

120 weight parts of $C_9$-$C_{15}$ alkyl phenol (dodecyl phenol content was 75-80 wt %), 120 weight parts of 200SN base oil, 70 weight parts of calcium hydroxide, 10 weight parts of tetracosyl benzenesulfonic acid, 13 weight parts of hexadecanoic acid, 9 weight parts of octadecyl alcohol and 1.5 weight parts of polyisobutylene succinic anhydride (number average molecular weight: 3380, and degree of polymerization: 22) were placed into a reaction kettle and homogenously mixed under heat and stirring to obtain a mixed solution. To the mixed solution were added 12 weight parts of sulfur and 0.3 weight parts of accelerator NS to obtain a mixed system consisting of the mixed solution, sulfur and accelerator NS, then 50 weight parts of ethylene glycol was added to the mixed system dropwise at a rate of 0.1 weight parts/min. During the dropwise addition of ethylene glycol, the mixed system began to be subjected to sulfurization reaction; after sulfurization reaction was carried out for 3 h, 6 weight parts of sulfur and 0.3 weight parts of accelerator NS were added, the sulfurization reaction was continued for 3 h. Afterwards, 6 weight parts of sulfur and 0.3 weight parts of accelerator NS were added, the sulfurization reaction was continued for 3 h. The sulfurization reaction temperature was 155-175° C., totally lasted for 9 h, and a sulfurization reaction solution was obtained. The sulfurization reaction solution was maintained at a temperature of 150-160° C. and dehydrated. When the water content of the system was 3.0 wt %, dehydration was stopped, and 45 weight parts of $CO_2$ was introduced to carry out carbonation reaction. The carbonization reaction temperature was 150-160° C., the reaction time was 6 h, and a carbonation reaction solution was obtained after carbonation reaction was complete. The unreacted alkyl phenol in the carbonation reaction solution was extracted using a solvent consisting of 300 weight parts of 200# solvent oil, 130 weight parts of methanol, 50 weight parts of ethanol, 6 weight parts of water and 8 weight parts of butanone, the carbonation reaction solution after extraction was subjected to distillation under vacuum under the conditions of −0.096 MPa and 220° C., then cooled down to 110° C. and centrifuged. The solution after centrifugation was mixed with 13 weight parts of diatomaceous earth homogenously and then filtrated to obtain 345 weight parts of sulfurized calcium alkyl phenolate product.

The resulting sulfurized calcium alkyl phenolate product was subjected to test using the test methods of Example 1 and the results were as follows: the content of free alkyl phenol was 0.6 wt %, the total base number was 289 mg KOH/g, the kinematic viscosity was 256 mm$^2$/s, the calcium content was 10.4 wt %, and the sulfur content was 3.4 wt %.

EXAMPLE 3

65 weight parts of $C_9$-$C_{15}$ alkyl phenol (dodecyl phenol content was 80-90 wt %), 60 weight parts of 300SN base oil, 20 weight parts of calcium oxide and 7 weight parts of calcium hydroxide, 5.5 weight parts of dodecyl benzenesulfonic acid, 7 weight parts of hexadecanoic acid, 4 weight parts of eicosanol and 0.3 weight parts of polyisobutylene succinic anhydride (number average molecular weight: 2400, and degree of polymerization: 16) were placed into a reaction kettle and homogenously mixed under heat and stirring to obtain a mixed solution. To the mixed solution were added 12 weight parts of sulfur to obtain a mixed system consisting of the mixed solution and sulfur, then 20 weight parts of ethylene glycol was added to the mixed system dropwise at a rate of 0.06 weight parts/min. During the dropwise addition of ethylene glycol, the mixed system began to be subjected to sulfurization reaction, the sulfurization reaction temperature was 150-170° C., totally lasted for 7 h, and a sulfurization reaction solution was obtained. The sulfurization reaction solution was maintained at a temperature of 155-160° C. and dehydrated. When the water content of the system was 3.1 wt %, dehydration was stopped, and 25 weight parts of $CO_2$ was introduced to carry out carbonation reaction. The carbonization reaction temperature was 160-175° C., the reaction time was 3 h, and a carbonation reaction solution was obtained after carbonation reaction was complete. The unreacted alkyl phenol in the carbonation solution was extracted using a solvent consisting of 180 weight parts of 120# solvent oil, 136 weight parts of methanol, 4 weight parts of water and 4 weight parts of acetone. The carbonation reaction solution after extraction was subjected to distillation under vacuum under the conditions of −0.096 MPa and 190° C., then cooled down to 100° C. and centrifuged. The solution after centrifugation was mixed with 8 weight parts of diatomaceous earth homogenously and then filtrated to obtain 168 weight parts of sulfurized calcium alkyl phenolate product.

The resulting sulfurized calcium alkyl phenolate product was subjected to test using the test methods of Example 1 and the results were as follows: the content of free alkyl phenol was 1.4 wt %, the total base number was 265 mg KOH/g, the kinematic viscosity was 261 mm$^2$/s, the calcium content was 9.7 wt %, and the sulfur content was 3.1 wt %.

EXAMPLE 4

180 weight parts of $C_9$-$C_{15}$ alkyl phenol (dodecyl phenol content was 75-80 wt %), 150 weight parts of 100SN base oil, 60 weight parts of calcium oxide and 12 weight parts of calcium hydroxide, 15 weight parts of dodecyl benzenesulfonic acid, 18 weight parts of tetradecanoic acid, 13 weight parts of eicosanol and 4.0 weight parts of polyisobutylene succinic anhydride (number average molecular weight: 2700, and degree of polymerization: 18) were placed into a reaction kettle and homogenously mixed under heat and stirring to obtain a mixed solution. To the mixed solution were added 12 weight parts of sulfur and 0.5 weight parts of accelerator NS to obtain a mixed system consisting of the mixed solution, sulfur and accelerator NS, then 55 weight parts of ethylene glycol was added to the mixed system dropwise at a rate of 0.1 weight parts/min. During the dropwise addition of ethylene glycol, the mixed system began to be subjected to sulfurization reaction. After sulfurization reaction was carried out for 4 h, 9 weight parts of sulfur and 0.3 weight parts of accelerator NS were added, the sulfurization reaction was continued for 4 h. Afterwards, 6 weight parts of sulfur and 0.2 weight parts of accelerator NS were added, the sulfurization reaction was continued for 4 h. The sulfurization reaction temperature was 145-165° C., totally lasted for 12 h, and a sulfurization reaction solution was obtained. The sulfurization reaction solution was maintained at a temperature of 155-160° C. and dehydrated. When the water content of the system was 2.7 wt %, dehydration was stopped, and 80 weight parts of $CO_2$ was introduced to carry out carbonation reaction. The carbonization reaction temperature was 170-180° C., the reaction time was 7.5 h, and a carbonation reaction solution was obtained after carbonation reaction was complete. The unreacted alkyl phenol in the carbonation solution was extracted using a solvent consisting of 350 weight parts of 150# solvent oil, 180 weight parts of methanol, 70 weight parts of propanol, 10 weight parts of water and 2 weight parts of butanedione. The carbonation reaction solution after extraction was subjected to distillation under vacuum under the conditions of −0.096 MPa and 190° C., then cooled down to 100° C. and centrifuged. The solution after centrifugation was mixed with 12 weight parts of diatomaceous earth homogenously and then filtrated to obtain 454 weight parts of sulfurized calcium alkyl phenolate product.

The resulting sulfurized calcium alkyl phenolate product was subjected to test using the test methods of Example 1 and the results were as follows: the content of free alkyl phenol was 1.2 wt %, the total base number was 262 mg KOH/g, the kinematic viscosity was 255 mm$^2$/s, the calcium content was 9.65 wt %, and the sulfur content was 3.3 wt %.

EXAMPLE 5

125 weight parts of $C_9$-$C_{15}$ alkyl phenol (dodecyl phenol content was 75-80 wt %), 105 weight parts of 500SN base oil, 58 weight parts of calcium oxide, 9.6 weight parts of tetracosyl benzenesulfonic acid, 12.4 weight parts of hexadecanoic acid, 8.5 weight parts of octadecyl alcohol and 1.3 weight parts of polyisobutylene succinic anhydride (number average molecular weight: 3380, and degree of polymerization: 22) were placed into a reaction kettle and homogenously mixed under heat and stirring to obtain a mixed solution. To the mixed solution were added 13 weight parts of sulfur, 0.7 weight parts of accelerator NS and 0.2 weight parts of accelerator DM to obtain a mixed system consisting of the mixed solution, sulfur, accelerator NS and accelerator DM, then 45 weight parts of ethylene glycol was added to the mixed system dropwise at a rate of 0.15 weight parts/min. During the dropwise addition of ethylene glycol, the mixed system began to be subjected to sulfurization reaction. After sulfurization reaction was carried out for 3 h, 9 weight parts of sulfur, 0.3 weight parts of accelerator NS and 0.1 weight parts of accelerator DM were added. The sulfurization reaction was continued for 3 h, the sulfurization reaction temperature was 165-185° C., totally lasted for 6 h, and a sulfurization reaction solution was obtained. The sulfurization reaction solution was maintained at a temperature of 160-165° C. and dehydrated. When the water content of the system was 2.8 wt %, dehydration was stopped, and 46 weight parts of $CO_2$ was introduced to carry out carbonation reaction. The carbonization reaction temperature was 145-155° C., the reaction time was 5 h, and a carbonation reaction solution was obtained after carbonation reaction was complete. The unreacted alkyl phenol in the carbonation solution was extracted using a solvent consisting of 280 weight parts of 200# solvent oil, 180 weight parts of methanol and 4 weight parts of water. The carbonation reaction solution after extraction was subjected to distillation under vacuum under the conditions of −0.096 MPa and 200° C., then cooled down to 105° C. and centrifuged. The solution after centrifugation was mixed with 10 weight parts of diatomaceous earth homogenously and then filtrated to obtain 315 weight parts of sulfurized calcium alkyl phenolate product.

The resulting sulfurized calcium alkyl phenolate product was subjected to test using the test methods of Example 1 and the results were as follows: the content of free alkyl phenol was 1.0 wt %, the total base number was 275 mg KOH/g, the kinematic viscosity was 272 mm$^2$/s, the calcium content was 10.1 wt %, and the sulfur content was 3.2 wt %.

The description of the above examples is only for purpose of helping to understand the method of the present invention and the core idea thereof. It should be noted that, a person skilled in the art can make several improvements and modifications on the present invention without departing from the principles of the present invention, and the improvements and modifications also fall within the protection scope of the claims of the present invention.

The invention claimed is:

1. A method for preparing sulfurized calcium alkyl phenolate, consisting of the following steps:
   a) mixing alkyl phenol, a calcium source, base oil, alkyl benzenesulfonic acid, fatty acid, fatty alcohol and polyisobutylene succinic anhydride to obtain a mixed solution, wherein
   the alkyl phenol is one or more of hexyl phenol, heptyl phenol, octyl phenol, nonyl phenol, decyl phenol, undecyl phenol, dodecyl phenol, tridecyl phenol, tetradecyl phenol and pentadecyl phenol, the calcium source is calcium oxide and/or calcium hydroxide, the base oil is one or more of 100SN base oil, 150SN base oil, 200SN base oil, 220SN base oil, 250SN base oil, 300SN base oil, 350SN base oil, 400SN base oil, 450SN base oil and 500SN base oil; the alkyl benzenesulfonic acid is one or more of dodecyl benzenesulfonic acid, tridecyl benzenesulfonic acid, tetradecyl benzenesulfonic acid, pentadecyl benzenesulfonic acid, hexadecyl benzenesulfonic acid, heptadecyl benzenesulfonic acid, octadecyl benzenesulfonic acid, nonadecyl benzenesulfonic acid, eicosyl benzenesulfonic acid, heneicosyl benzenesulfonic acid, docosyl benzenesulfonic acid, tricosyl benzenesulfonic acid and tetracosyl benzenesulfonic acid; the fatty acid is one or more of tetradecanoic acid, pentadecanoic acid, hexadecanoic acid, heptadecanoic acid and octadecanoic acid; the fatty alcohol is one or more of tetradecyl alcohol, pentadecyl alcohol, cetyl alcohol, heptadecanol, octadecyl alcohol, nonadecyl alcohol and eicosanol; the polyisobutylene succinic anhydride has a number average molecular weight of 2,400-3,380; and the polyisobutylene succinic anhydride has a polymerization degree of 16-22; the mass ratio of the alkyl phenol, the calcium source, the base oil, the alkyl benzenesulfonic acid, the fatty acid, the fatty alcohol and the polyisobutylene succinic anhydride is 110-130:48-70:100-120:9-11:12-14:8-9:1.2-2.7;
   b) mixing the mixed solution, ethylene glycol and a sulfur source to carry out sulfurization reaction in the presence of a sulfurization accelerator to obtain a sulfurization reaction solution, wherein
   the sulfur source is sulfur, the sulfurization accelerator is sulfurization accelerator NS and/or sulfurization accelerator DM, the mass ratio of the ethylene glycol to the alkyl phenol in the mixed solution is 35-50: 110-130; the mass ratio of the sulfur source to the alkyl phenol in the mixed solution is 18-24:110-130, the mass ratio of the sulfurization accelerator to the alkyl phenol in the mixed solution is 0.6-1.3:110-130, the sulfurization reaction is carried out at 145-185° C. for a time of 6-12 h;
   c) implementing carbonation reaction between the sulfurization reaction solution and $CO_2$ to obtain a carbonation reaction solution; wherein
   implementing carbonation reaction between the sulfurization reaction solution and $CO_2$ is realized by introducing $CO_2$ gas into the sulfurization reaction solution, the mass ratio of $CO_2$ to the alkyl phenol in step a) is 37-54:110-130, the temperature for the carbonation reaction is 145-180° C., the time for the carbonation reaction is 3-7.5 h; before implementing carbonation reaction between the sulfurization reaction solution and $CO_2$, the sulfurization reaction solution is dehydrated at first, the dehydration is conducted in a water segregator; the operating temperature of the water segregator is controlled at 150-170° C., during the dehydration process, the water content in the sulfurization reaction solution is continuously reduced, when the water content in the sulfurization reaction solution has been reduced to 2.5-3.1 wt %, the dehydration is stopped, and carbonation reaction is carried out;
   and
   d) extracting the carbonation reaction solution with a solvent, upon refining, to obtain the sulfurized calcium alkyl phenolate;
   wherein
   the solvent includes solvent oil, water and oxygenous derivative of hydrocarbon;
   the solvent oil has a boiling point greater than 100° C.;
   the solvent oil is one or more of 100# solvent oil, 120# solvent oil, 140# solvent oil, 150# solvent oil, 180# solvent oil, 190# solvent oil, 200# solvent oil, 260# solvent oil, 270# solvent oil, 280# solvent oil, 300# solvent oil and 330# solvent oil;
   the oxygenous derivative of hydrocarbon is alcohol and/or ketone, wherein the alcohol is one or more of methanol, ethanol and propanol, the ketone is one or more of acetone, butanone and butanedione;

the oxygenous derivatives of hydrocarbon are alcohol and ketone;

the mass ratio of alcohol to ketone is 136-250:2-8;

the mass ratio of the solvent oil, the oxygenous derivatives of hydrocarbon and water is 180-350:140-252:4-10; and the mass ratio of the solvent to the alkyl phenol in step a) is 408-650:110-130.

2. A sulfurized calcium alkyl phenolate prepared by the method according to claim 1, wherein the content of free alkyl phenol is below 1.5 wt % in the sulfurized calcium alkyl phenolate.

3. A lubricant oil containing: 0.5-25 weight percentages of the sulfurized calcium alkyl phenolate prepared by the method according to claim 1 and 99.5-75 weight percentages of base oil.

\* \* \* \* \*